INVENTOR.
WALTER J. OLSON

INVENTOR.
WALTER J. OLSON
BY Wallace and Cannon
ATTORNEYS

June 28, 1955 W. J. OLSON 2,711,831
FOUNDRY DEVICES
Original Filed Nov. 8, 1949 6 Sheets-Sheet 6
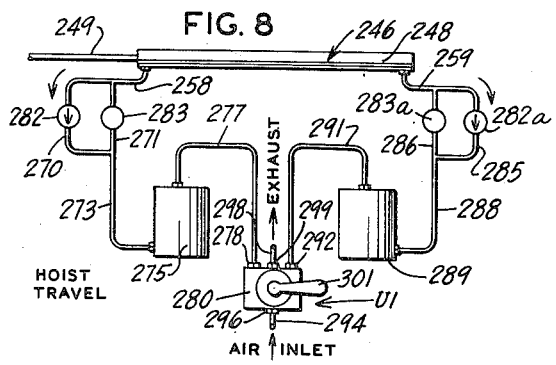
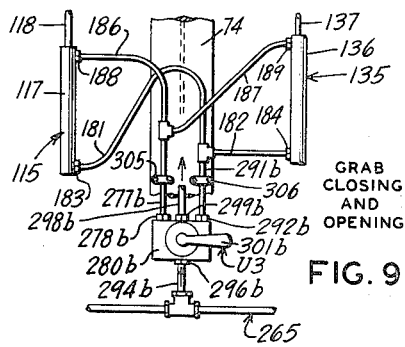
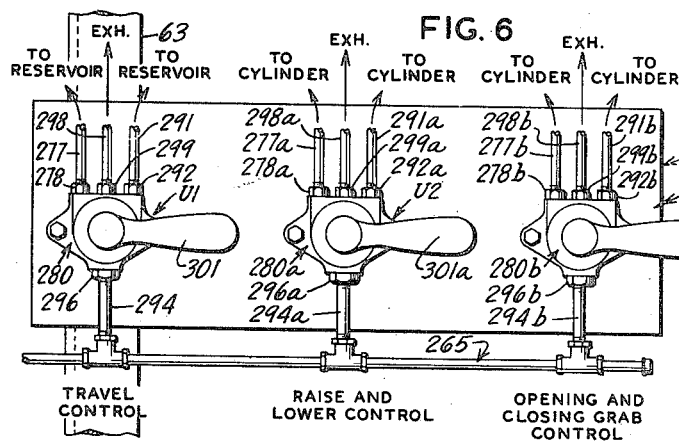
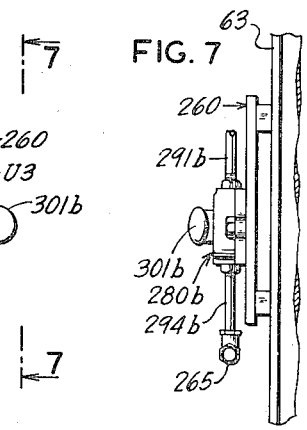
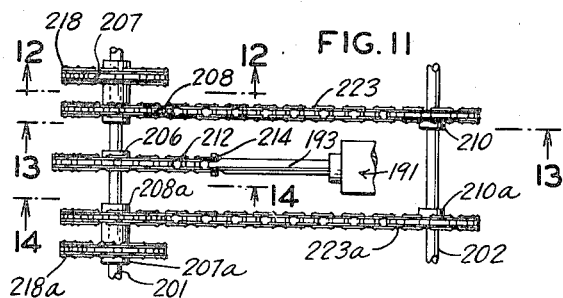
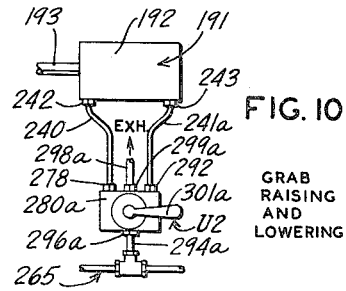
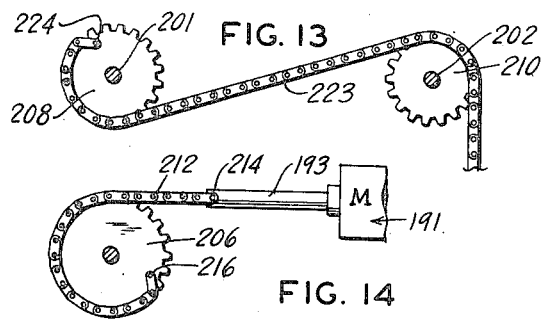
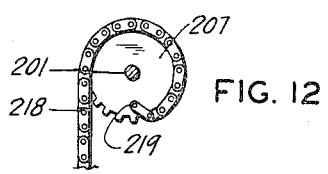
*INVENTOR.*
WALTER J. OLSON
BY Wallace and Cannon
*ATTORNEYS*

United States Patent Office 2,711,831
Patented June 28, 1955

2,711,831

FOUNDRY DEVICES

Walter J. Olson, Paterson, N. J., assignor to American Brake Shoe Company, New York, N. Y., a corporation of Delaware Original application November 8, 1949, Serial No. 126,112, now Patent No. 2,638,645, dated May 19, 1953. Divided and this application July 5, 1952, Serial No. 297,286

1 Claim. (Cl. 212—129)

This application is a division of my co-pending application, Serial No. 126,112, filed November 8, 1949, now United States Letters Patent No. 2,638,645, issued May 19, 1953.

This invention relates to foundry equipment, and more particularly to transporting devices, of the type particularly well adapted for use in handling molds and flasks in foundries and the like.

In many places, and especially in factories, foundries, and the like, it is often necessary to transport relatively heavy articles repeatedly over the same path. This is especially true in foundries wherein after molds have been poured they are normally stored at a cooling station until cool and are then transported to a shake-out device which is effective to vibrate the mold in such a manner that the casting and the molding sand are separated from the flask and, in addition, the sand is vibrated off from the casting, the castings then being transported to a suitable storage place, and the flasks being transported to another storage space where they may be cleaned and made ready for re-use.

Various types of grabs have been known and heretofore used in the manufacturing and foundry art, and the like. However, many such grabs have had several inherent disadvantages such as, for example, being costly and difficult to manufacture; being difficult and impractical in construction and operation, and the like.

An important object of my invention is to overcome these disadvantages and to afford a novel grab which may be economically manufactured and is practical and efficient in construction and operation.

Yet another object is to construct a novel grab of the aforementioned type which is well adapted for handling foundry molds, and the like, and which is movable both vertically and horizontally, in a novel and expeditious manner.

A further object is to afford a novel grab of the aforementioned type wherein the operator may be transported therewith during movement of the grab in a horizontal direction.

A further object is to enable a grab of the aforementioned type to be installed and used in a novel and expeditious manner in a foundry or the like with little loss of floor space, and in a manner whereby the grab may be used effectively and efficiently to raise and lower articles to be transported, and to transport such articles horizontally.

Another object is to construct a novel grab for picking up and transporting articles horizontally and which embodies grappling arms and power means so constituted and arranged that the grappling arms may be moved toward and away from each other, the grappling arms may be moved upwardly and downwardly as a unit, and the grappling arms may be moved horizontally as a unit to transport an article supported thereby, by reciprocating-piston type power means wherein the piston may be reciprocated by pressure exerted thereon by working fluid fed into the power means under pressure.

Other and further objects of the present invention will be apparent from the following description and claim and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claim.

In the drawings:

Fig. 6 is a detail rear elevational view of control mechanism shown in Fig. 2;

Fig. 7 is a detail end elevational view taken substantially along the line 7—7 in Fig. 6;

Fig. 8 is a diagrammatic view showing the control system for controlling the horizontal travel of the hoist shown in Fig. 3;

Fig. 9 is a diagrammatic view showing the control system for opening and closing the grab shown in Fig. 4;

Fig. 10 is a diagrammatic view showing the control system for raising and lowering the grab shown in Fig. 4;

Fig. 11 is a detail view of part of the mechanism shown in Fig. 1 for raising and lowering the grab;

Fig. 12 is a detail sectional view taken substantially along the line 12—12 in Fig. 11;

Fig. 13 is a detail sectional view taken substantially along the line 13—13 in Fig. 11;

Fig. 14 is a detail sectional view taken substantially along the line 14—14 in Fig. 11;

Fig. 15 is a detail sectional view taken substantially along the line 15—15 in Fig. 1;

Fig. 16 is a diagrammatic view showing the control system for operating the conveyor mechanism embodied in my novel system; and Fig. 17 is a diagrammatic view showing the control system for stop mechanism embodied in the conveyor shown in Figs. 1, 2 and 3.

Figure 1:
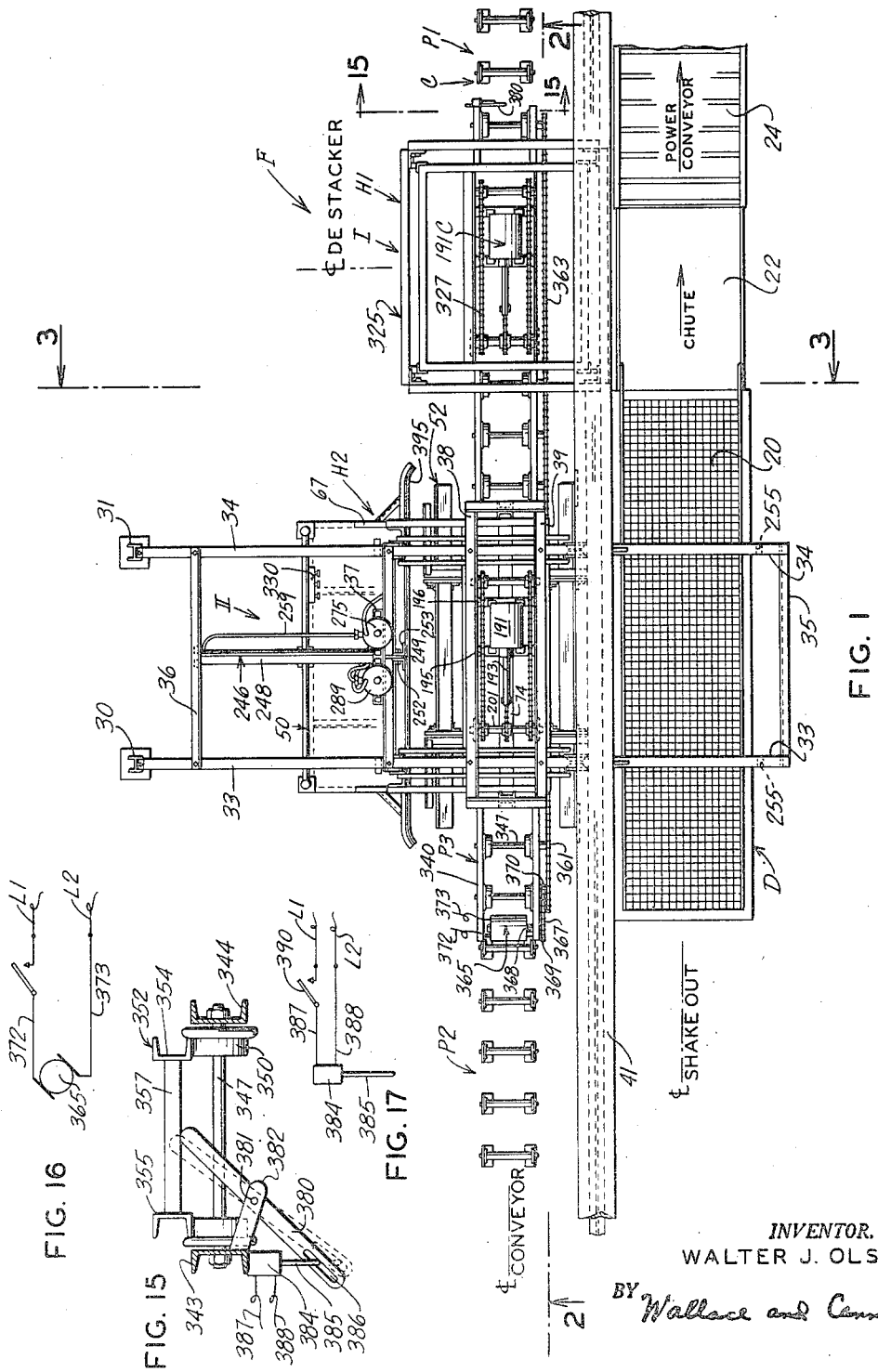
Fig. 1 is a plan view of a portion of a foundry system embodying the principles of my invention.

To illustrate the preferred embodiment of my invention, a hoist H2, embodying the principles of my invention, is shown in the drawings in operative position in a foundry system F which includes, in genereal a conveyor C, another hoist H1 and a shake-out device D.

In general, in the operation of the preferred embodiment of my novel foundry system, molds which have been poured are stored in stacked relation at a cooling station, not shown, during the period required for the molds to cool. Thereafter, the stacks of molds are fed from the cooling station along the approach P1 of the conveyor C to the left, as viewed in Fig. 1, into a first work station I at which the hoist H1 is disposed. In the operation of my novel foundry system, the molds above the first layer in the stack disposed at station I, are raised by the hoist H1. Thereafter, the bottom layer of the stack, and which was not raised by the hoist H1, is moved by suitable operation of the conveyor C from station I to a work station II, at which the hoist H2 is disposed. This group of molds thus fed to work station II may then be picked up by hoist H2 and transported to the shake-out device D wherein the molding sand and the castings are dislodged from the flasks, with the sand dropping down through a screen 20 in the shake-out device D, and the castings sliding down a chute 22 to a suitable power conveyor, such as, for example, a belt conveyor 24 by which the castings may be transported to a suitable storage place, not shown. The empty flasks on the shake-out device D may then be picked up by the hoist H2 and returned to the conveyor C at the second work station II and by suitable operation of the conveyor C may be fed from work station II along the discharge portion P2 of the conveyor C to the left to a suitable storage space, not shown, wherein they may remain until it is necessary to again prepare molds therein and pour the same, after which the aforementioned operations may be repeated.

As the empty flasks are being returned from the shake-out device D to the second work station 11 the hoist H1 at the first work station I may be operated to thereby lower the upper layers of the stack originally raised from the work station I back down into the conveyor C, and then, the hoist H1 may again be operated to raise the layer or layers above the bottom layer of molds then disposed on the conveyor C at station I. Hence, after the empty flasks have been returned from the shake-out device D to the conveyor C at the second work station II, the subsequent operation of the conveyor C to thereby feed the empty flasks from the second work station II to the left, as previously mentioned, may be performed in conjunction with movement of the molds disposed at that time on the conveyor C at station I to the left along the conveyor C into station II. These operations, it will be seen, may be repeated until each of the layers of molds originally fed into station I has been fed through station II onto the shake-out device, shaken out, and the empty flasks returned to station II and fed therefrom along the conveyor C toward the storage space for empty flasks. After this has been completed, another stack of molds may be fed along the conveyor C into station I and the aforementioned cycle of operations repeated.

Figure 2:
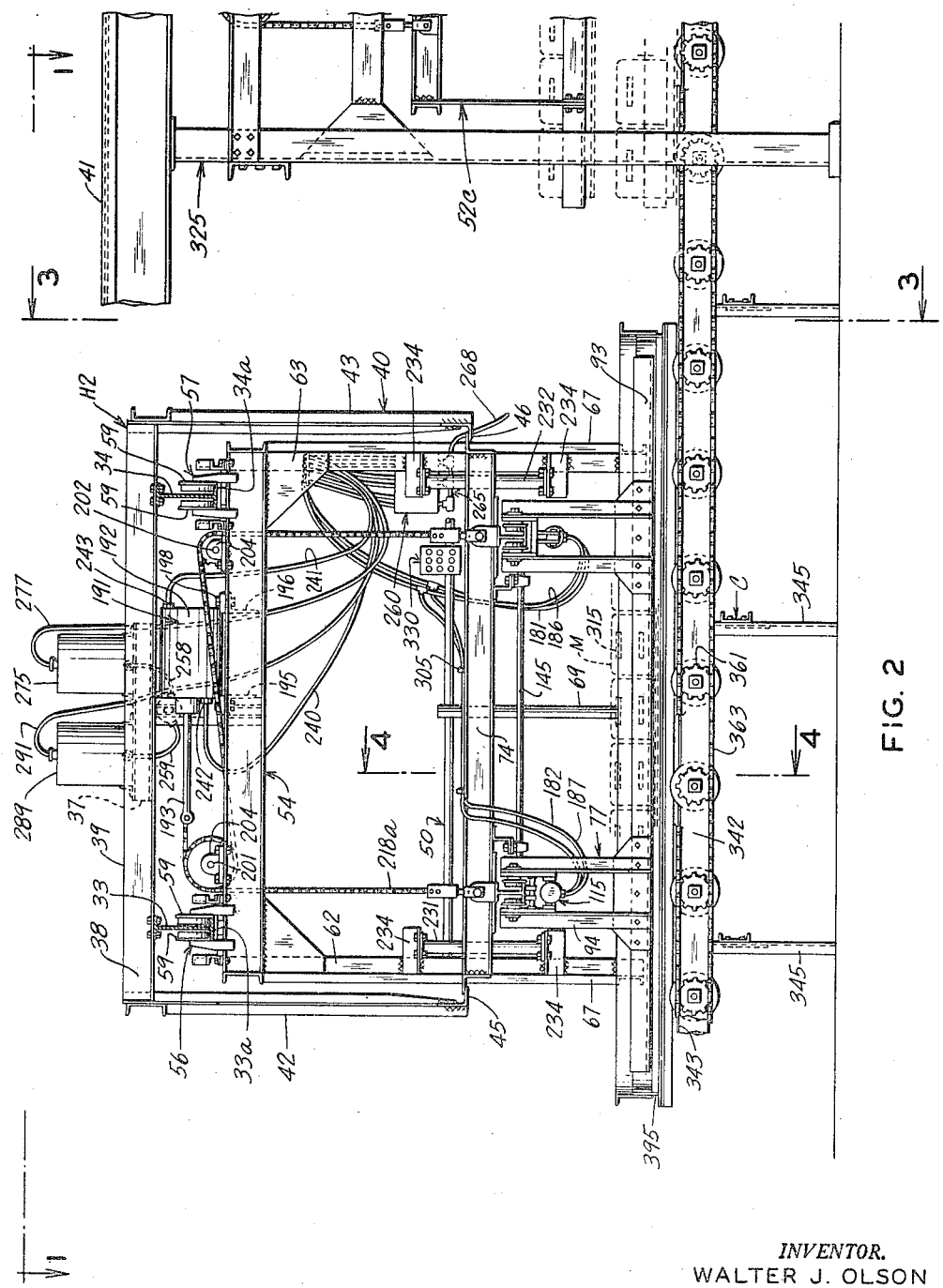
Fig. 2 is a sectional view taken substantially along the line 2—2 in Fig 3, showing in front elevation, a portion of hoisting mechanism shown in Fig. 1.
Figure 3:
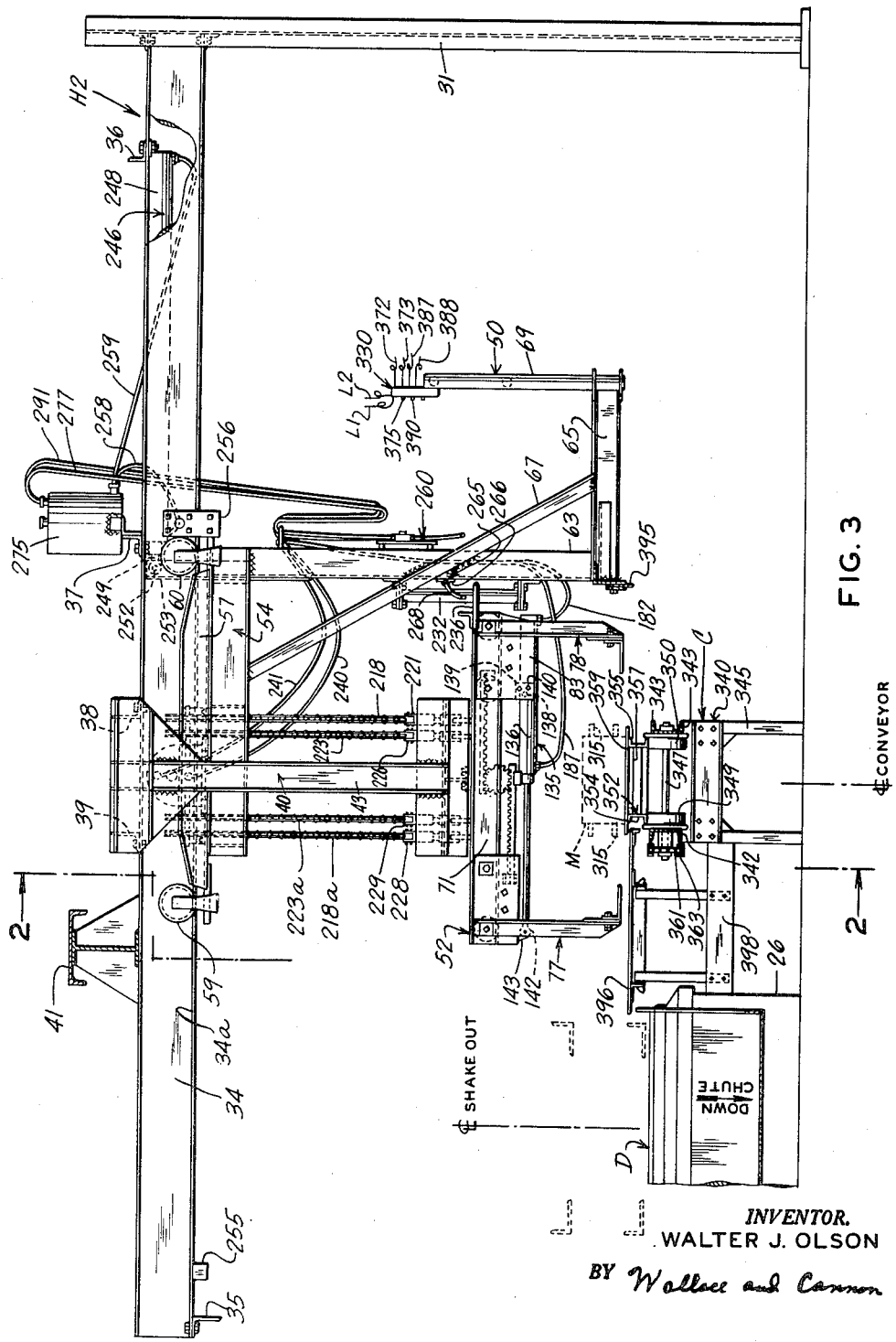
Fig. 3 is a sectional view taken substantially along the line 3—3 in Fig. 1.

The hoisting device H2, Figs. 1, 2 and 3, by which the molds passing through station II are transported to the shake-out device D and back to the conveyor C, preferably comprises two suitable pillars or posts such as I-beams 30 and 31, Figs. 1 and 3, which are mounted on and project upwardly from the floor in the foundry or shop in parallel spaced relation to each other. Two beams such as I-beams 33 and 34 are mounted at one end on, and project horizontally from, the upper end portions of the posts 30 and 31 and are connected together by suitable cross braces 36, 37, 38, 39, and 35, Figs. 1 and 2, the cross braces 38 and 39 extending outwardly on each side of the I-beams 33 and 34, Fig. 2. The other end portions of the beams 33 and 34 are preferably supported from above by suitable building structure such as the girder 41, Fig. 3.

A grab stop 40 comprising two elongated arms 42 and 43 depending from the cross braces 37 and 38 of the hoist H2, is mounted on the I-beams 33 and 34 with the legs 42 and 43 disposed in spaced relation to the I-beams 33 and 34, as best shown in Figs. 2 and 3. The legs 42 and 43 of the grab stop 40 are disposed in parallel relation to each other, and each has an inwardly projecting flange or leg 45 and 46, respectively, on the lower end portion thereof which affords supporting means for the grab of the hoisting mechanism H2, when the grab is in its lowermost position, as will be discussed in greater detail presently.

The posts 30 and 31, the I-beams 33 and 34, the cross-braces 36—39, and the grab stop 40, comprise a supporting structure which may be referred to as the stationary supporting structure of the hoisting device H2. Movable mechanism, including a cage 50 and grab 52 is mounted on the aforementioned stationary supporting structure of the hoisting device H2 and, as will be discussed in greater detail presently, affords means for transporting molds or flasks between the conveyor C and the shake-out device D.

The cage 50 of the hoisting device H2 includes a supporting frame 54 mounted on, and depending from, two carriage 56 and 57, which are mounted on the I-beams 33 and 34, respectively, for movement therealong. Each of the carriages 56 and 57 comprises two pairs of rollers 59 and 60, Figs. 2 and 3, the rollers in each pair being mounted on the lower flange 33a and 34a of the respective I-beams 33 and 34 on opposite sides of the web of the I-beams 33 and 34, whereby the lower flanges 33a and 34a of the I-beams 33 and 34 affords tracks on which the rollers 59 and 60 may roll with the web of the I-beams 33 and 34 affording a partition wall between the rollers in each pair to thereby afford a guide member for the carriages 56 and 57.

Two hanger arms 62 and 63, Fig. 2, are mounted on on opposite sides of the rear end portion of the supporting frame 54, which is disposed toward the right, as viewed in Fig. 3, and depend therefrom in parallel spaced relation to each other. A floor or platform 65, Fig. 3, is mounted on the lower end portion of the hanger arms 62 and 63 by any suitable means such as, for example welding and extends substantially horizontally therefrom in a rearward direction. Suitable braces such as the brace 67, Fig. 3, may be attached to the platform 65 and the supporting frame 54 to lend further support to the platform 65. A guard rail 69 may be mounted on the rear end portion of the platform 65 and projects upwardly therefrom, as shown in Fig. 3, to afford a hand rail for the operator who will stand on the platform 65 during the operation of the hoist H2, as will be presently discussed in greater detail.

Figure 4:
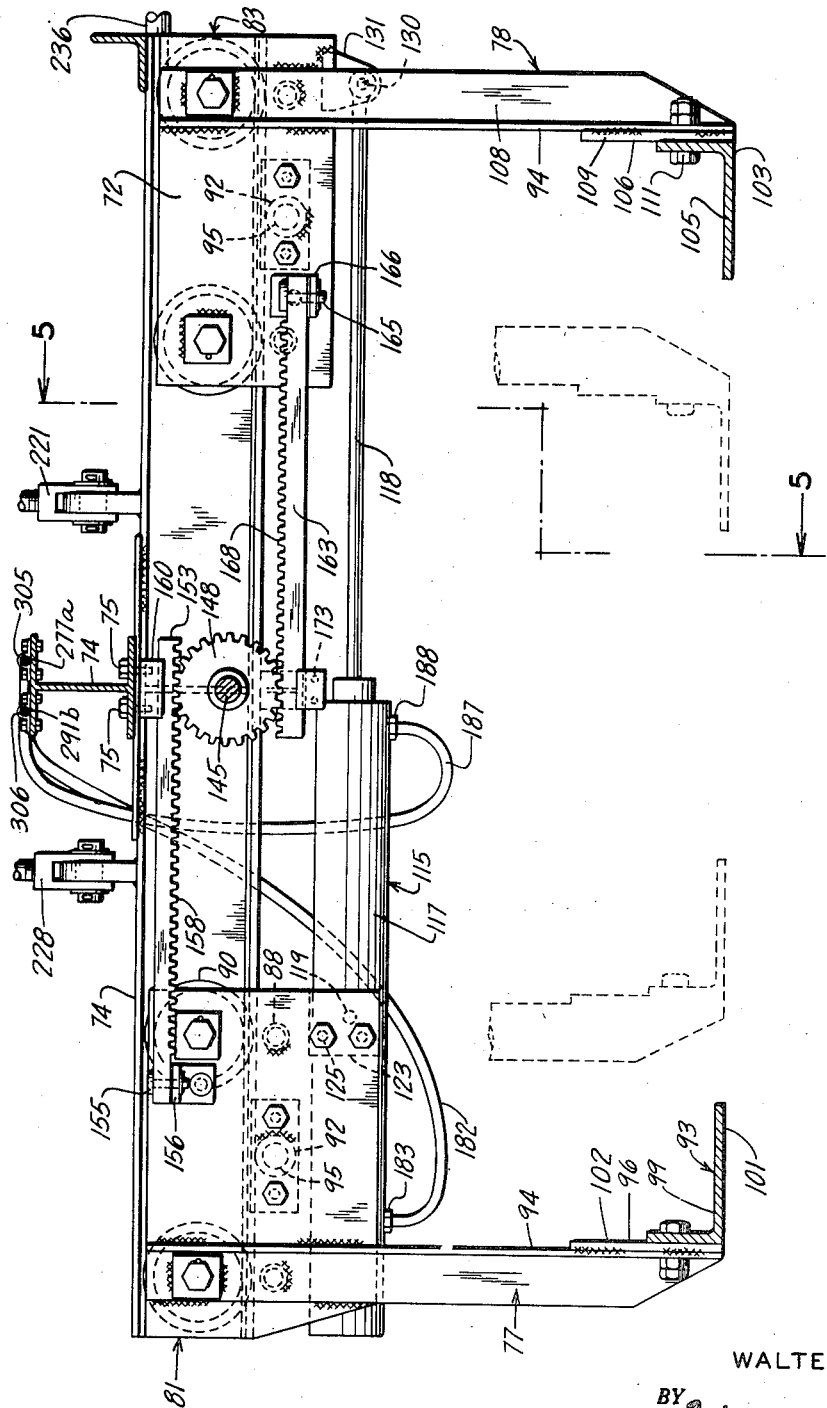
Fig. 4 is a detail sectional view of the grab shown in Fig. 2, this view being taken substantially along the line 4—4 in Fig. 2.
Figure 5:
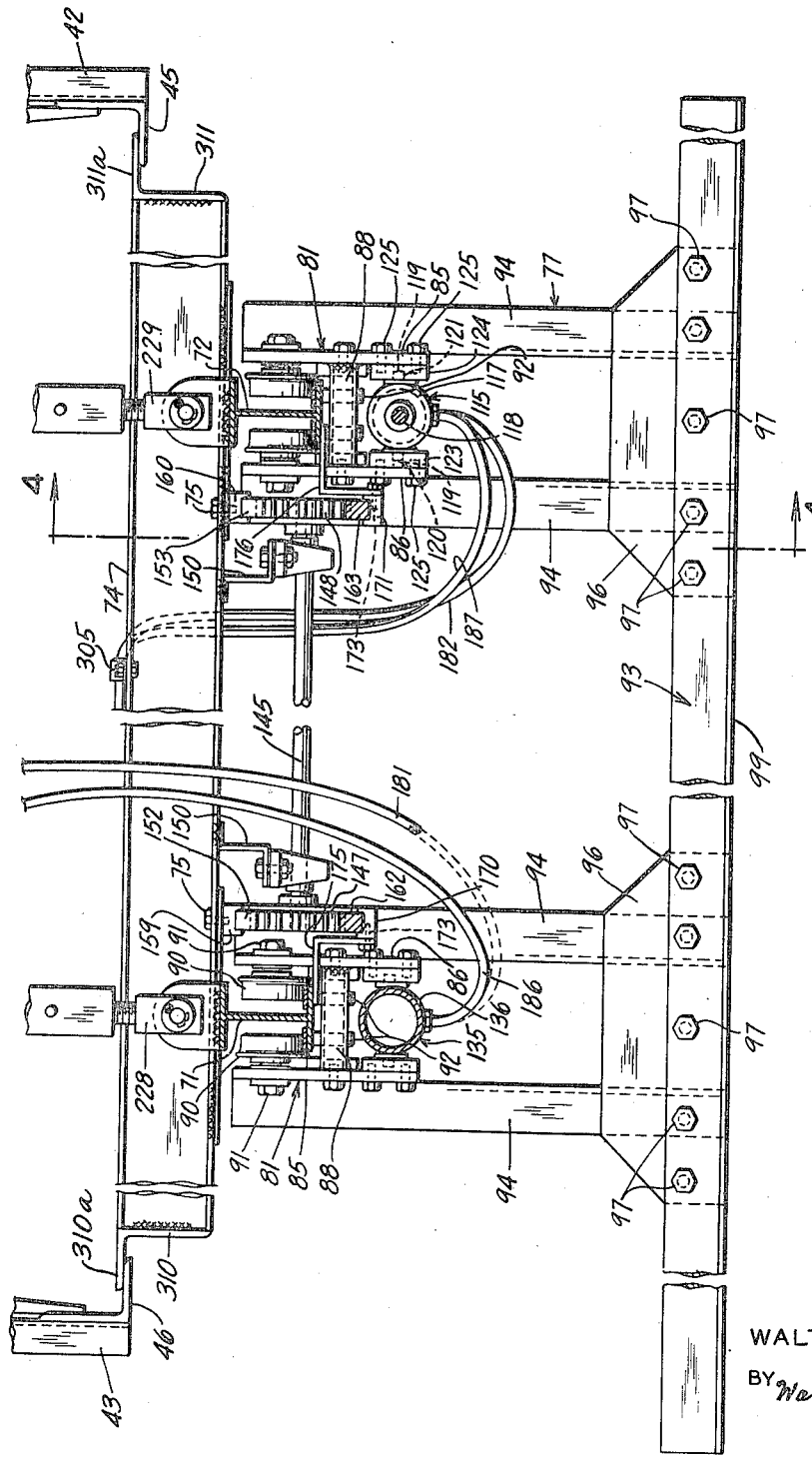
Fig. 5 is a detail sectional view taken substantially along the line 5—5 in Fig. 4.

The grab 52, Figs. 3, 4 and 5, which is movably supported on the supporting frame 54, for raising and lowering molds relative to the conveyor C at station II, includes two elongated side rails 71 and 72, Fig. 5, disposed in spaced parallel relation to each other, and an elongated cross beam 74 connected between intermediate portions of the side rails 71 and 72 by suitable means such as bolts 75, Fig. 4. Two grappling arms 77 and 78, Figs. 3 and 4, are mounted on the side rails 71 and 72 for movement toward and away from each other, the grappling arm 77 being mounted on the side rails 71 and 72 by means of carriages 81, Figs. 4 and 5, from which the grappling arm 77 depends, and the grappling arm 78 being similarly mounted on the I-beams 71 and 72 by means of similar carriages 83, Fig. 4, from which the grappling arm 78 depends. The carriages 81 and 83 are all similar, each comprising two plates 85 and 86, Fig. 5, disposed in parallel spaced relation to each other and retained in such relation by means of a suitable spacer 88 disposed therebetween and connected thereto by suitable means such as welding. Each of the carriages 81 and 83 includes four rollers 90 journaled on suitable shafts 91 mounted in the plates 85 and 86, with two of the four rollers in each carriage being rotatably mounted on a corresponding one of the plates 85 and 86, respectively. The rollers 90 and 91 are disposed at the upper edge portion of the plates 85 and 86, Fig. 5, and are mounted on the lower flanges of the respective I-beams 71 and 72, the side plates 85 and 86 of the carriages 81 and 83 depending from the rollers 90 with the spacers 88 disposed below the I-beams 71 and 72 whereby the carriages 81 and 83 may be moved longitudinally of the I-beams 71 and 72 with the rollers 90 rolling along the lower flange of the I-beams 71 and 72 to thereby support the carriages 81 and 83.

Each of the carriages 81 and 83 also includes another pair of rollers 92, Figs. 4 and 5, rotatably mounted on shafts 95 extending between the plates 85 and 86, the rollers 92 being disposed in rolling contact with the lower face of the respective I-beams 71 and 72 to thereby hold the carriages 81 and 83 against upward movement relative to the I-beams 71 and 72.

The grappling arm 77 of the grab 52, Figs. 4 and 5, comprises a horizontally disposed jaw member 93 to which is connected four drop legs 94, Fig. 5, the lower end portions of each end pair of the drop legs 94 being connected together by a gusset plate 96 welded thereto. The jaw member 93 comprises an elongated bar 99 formed of suitable material such as an angle iron having a horizontally disposed flange 101 and an upwardly projecting flange 102, the upwardly extending flange 102 being attached to the gusset plates 96 and the lower end portions of the drop legs 94 by suitable means such as bolts 97.

The grappling arm 78, Fig. 4, is similar to the grappling arm 77, including a jaw member 103 comprising an angle iron having a horizontally disposed flange 105 and a vertically disposed flange 106. Drop legs 108, having gusset plates 109 welded to the lower end portions thereof, are connected to the jaw member 103 by bolts 111 which extend through the drop legs 108 and the plate 109.

As is best seen in Fig. 5, the drop legs in each end pair of drop legs 94 of the grappling arm 77 extend vertically along opposite sides of a respective one of the carriages 81, and is attached to a respective one of the side plates 85 and 86 of the carriage 81 by suitable means such as welding, Fig. 4. The drop legs 108 of the grappling arm 78 similarly extend along, and are welded to the side plates 85 and 86 of corresponding carriages 83, Fig. 4.

A hydraulic motor 115, comprising a cylinder or housing 117 and a piston or plunger 118 reciprocably mounted therein, is pivotally mounted between, and attached, to the plates 85 and 86 of one of the carriages 81, Figs. 4 and 5. Two pins or studs 119 project outwardly from opposite sides of the housing 117 of the motor 115 and are journaled in complementary openings 120 and 121, respectively, in mounting blocks 123 and 124 attached to the inner face of the lower end portion of the plates 86 and 85, respectively, of the carriage 81 by suitable means such as bolts 125. The free end portion of the piston 118 is connected to the side plates 85 and 86 of the carriage 83 on the I-beam 72 by means of a pivot 130 mounted in bracket plates 131 attached to the inner face of the lower end portion of the last mentioned side plates 85 and 86 of the carriage 83.

Similarly, a hydraulic motor 135, Figs. 3 and 5, comprising a cylinder or housing 136 and a piston or plunger 137 is mounted between the side plates 85 and 86 of the carriage 83 on the I-beam 71, the cylinder 136 being rotatably mounted on pins 138, Fig. 3, journaled in blocks 139 mounted on the inner faces of the plates 85 and 86 of the carriage 83 by means of bolts 140. The free end portion of the shaft 137 is attached to the side plates 85 and 86 of the carriage 81 mounted on the I-beam 71 by a pivot pin 142, Fig. 3, mounted between brackets 143 carried by the last mentioned side plates 85 and 86.

A shaft 145, Fig. 5, having rack wheels 147 and 148 mounted on the opposite end portions thereof, for rotation therewith, is rotatably mounted in brackets 150 attached to and depending from the cross beam 74 of the grab 52. Two racks 152 and 153, Fig. 5, are connected to the inner plate 86 of corresponding carriages 81 on the grappling arm 77 by means of pins 155, Fig. 4, extending through brackets 156 mounted on the inner faces of the respective ones of the plates 86. The racks 152 and 153 have teeth 158 disposed on the lower face thereof, Fig. 4, and are slidably mounted in guide members 159 and 160, respectively, Fig. 5, which are secured to the cross beam 74 by means of the bolts 75, the guide members 159 and 160 engage the upper portion of the racks 152 and 153, and are effective to retain the teeth 158 of the racks 152 and 153 in operative engagement with the teeth on the rack wheels 147 and 148, respectively.

Similarly, two racks 162 and 163, Fig. 5, are attached to the lower edge portion of the inner face of the plate 86 on respective carriages 83 on the grappling arm 78 by means of pins 165, Fig. 4, extending through the racks 162 and 163 and through brackets 166 mounted on the inner face of the last mentioned plate 86 of the carriages 83. Like the racks 152 and 153, the racks 162 and 163 have teeth 168 formed in the upper face thereof and are slidably mounted in guides 170 and 171 connected by pins 173 to brackets 175 and 176 attached to the lower surface of the I-beams 71 and 72, respectively, the guide members 170 and 171 engaging the lower edge portion of the racks 162 and 163 and being effective to hold the teeth 168 on the racks 162 and 163 in operative engagement with the teeth on the rack wheels 147 and 148 respectively.

Thus, it will be seen that upon reciprocation of the plungers 118 and 137 in the cylinders 117 and 136 of the hydraulic motors 115 and 135, respectively, the grappling arms 77 and 78 are thereby caused to reciprocate along the I-beams 71 and 72 relative to each other, the engagement of the rack wheels 147 and 148 on the shaft 145 with the racks 152 and 162, and the racks 153 and 163, respectively, affording positive guiding means whereby proper alignment and positioning of the jaws 102 and 103 of the grappling arms 77 and 78 is assured during reciprocation of the grappling arms 77 and 78 by the motors 115 and 135. Also, it will be seen that, if necessary, a movement of the grappling arms 77 and 78 in opening and closing relation relative to each other may be effected by either one of the hydraulic motors 115 or 135, the interconnection of the opposite ends of the grappling arms 77 and 78 by the rack wheels 147 and 148 on the shaft 145 and the racks 152, 153, 162 and 163 being effective to afford a driving connection for the opposite end portions of the grappling arms 77 and 78.

Reciprocation of the pistons 118 and 137 in the motors 115 and 135 may be effected by alternately feeding a suitable working fluid such as, for example, compressed air, into the opposite end portions of the housings 117 and 136, respectively and, for this purpose, I afford hoses 181 and 182 connected by suitable coupling members 183 and 184 to the outer end portions of the cylinders 117 and 136, respectively, Figs. 4 and 5, and hoses 186 and 187 connected by suitable coupling members 188 and 189 to the inner end portions of the cylinders 117 and 136, respectively, suitable control means being connected to the hoses 181, 182, 186, and 187, as will be discussed in greater detail presently.

For the purpose of raising and lowering the grab 52 relative to the supporting frame 54 of the cage 50, I have afforded a motor 191, Figs. 1, 2, 3 and 11, comprising a cylinder or housing 192 and a piston or plunger 193 reciprocably mounted therein. The housing 192 of the motor 191 is mounted on cross beams 195 and 196, Figs. 1 and 2, on the supporting frame 54 of the cage 50 and is secured thereto by means of bolts 198, Fig. 2.

Two shafts 201 and 202, Figs. 1, 2 and 11, are journaled in suitable bearings 204 mounted on the upper surface of the supporting frame 54 of the cage 50 on opposite sides of the motor 191. A sprocket wheel 206 is mounted on the intermediate portion of the shaft 201, Fig. 11, for rotation therewith and two additional sprocket wheels 207 and 208 are mounted on one end portion of the shaft 201 and are disposed at one side of the sprocket wheel 206. A sprocket wheel 210 is mounted on the shaft 202 for rotation therewith and is disposed in radial alignment with the sprocket wheel 208. A sprocket chain 212, Figs. 11 and 14, is connected at one end by a clevis joint 214 to the free end portion of the plunger 193 of the motor 191 and the other end portion of the chain 212 is trained over the sprocket wheel 206 in operative engagement therewith and is pivotally connected to the sprocket wheel 206 by a pin 216.

A sprocket chain 218, having one end connected to the wheel 207 by a pin 219, Fig. 12, is trained over the sprocket wheel 207 and depends from the outside edge thereof, and the lower end portion of the chain 218 is connected by a clevis 221 to the top of the I-beam 72, Fig. 3.

Another sprocket chain 223, Figs. 11 and 13, is connected at one end to the sprocket wheel 208 by means of a pin 224 and is trained under the sprocket wheel 208 and over the sprocket wheel 210 and depends from the outwardly disposed peripheral edge portion of the wheel 210 and is connected to the top of the I-beam 71 by means of a clevis 226, Fig. 3.

On the other side of the sprocket wheel 206 from the sprocket wheels 207 and 208, two sprocket wheels 207a and 208a are positioned on the other end portion of the shaft 201 in positions corresponding to the positions of the sprocket wheels 207 and 208, respectively. Also, as is best seen in Fig. 11, a sprocket wheel 210a is mounted on the other end portion of the shaft 202 from the wheel 210, and is disposed in radial alignment with the wheel 208a. A sprocket chain 218a, Fig. 11, is mounted on and trained over the sprocket wheel 207a in a manner similar to that in which the sprocket chain 218 is mounted on and trained over to the sprocket 207, and depends from the outer peripheral edge portion of the sprocket wheel 207a and is connected to the top of the I-beam 72 by means of a clevis 228, Figs. 1 and 4. Also, similar to the manner in which the sprocket chain 223 is mounted on and trained over the sprocket wheels 208 and 210, a sprocket chain 223a is connected to the sprocket wheel 208a and is trained under the sprocket wheel 208a and over the sprocket wheel 210a and depends from the sprocket wheel 210a and is mounted to the top of the I-beam 71 by means of a clevis 229, Figs. 3 and 5.

Hence, it will be seen that upon inward movement of the plunger 193 relative to the housing 192 of the motor 191, or, in other words, upon movement of the plunger 193 to the right, as viewed in Fig. 11, the sprocket wheel 206 and, therefore, the shaft 201 is caused to rotate in a clockwise direction, as viewed in Fig. 14, which is thereby effective to cause the sprocket wheels 207, 208, 207a and 208a to rotate in a corresponding direction. This, it will be seen, is effective to cause the chains 218 and 218a to be moved upwardly around the sprocket wheels 207 and 207a, and is likewise effective to cause the chains 223 and 223a to be moved forwardly around the sprocket wheels 210 and 210a, respectively, and, thereby effective to lift the grab 52.

Conversely, it will be seen that upon movement of the plunger 193 outwardly relative to the housing 192 of the motor 191, or, in other words, to the left, as viewed in Fig. 11, the wheel 206 and, therefore, the shaft 201 is freed for rotation in a counter-clockwise direction, as viewed in Fig. 14, whereby the weight of the grab 52 on the chains 218, 218a, 223 and 223a is effective to cause the chains 218, 218a, 223 and 223a to unwind from the sprocket wheels 207, 207a, 208 and 208a respectively, and thereby lower the grab 52.

For guiding the grab 52 in the aforementioned upward and downward movement, I prefer to afford vertically extending guide rods 231 and 232 mounted on the hanger arms 62 and 63 of the cage 50, respectively, Fig. 2, by suitable means such as brackets 234, and guide loops 236, which are mounted on opposite ends of the upper end portion of the grappling arms 78, are disposed around the guide rods 231 and 232 to thereby retain the grab 52 in substantially the same vertically extending parallel relation to the hanger arms 62 and 63 during raising and lowering of the grab 52.

Reciprocation of the piston 193 in the housing 192 of the motor 191 may be effected by alternately feeding suitable working fluids such as, for example, compressed air, into one end and then the other of the housing 192, and, for this purpose, I have afforded hoses 240 and 241 connected to the front and rear end portions of the housing 192 by coupling members 242 and 243, respectively, suitable control means being connected to the hoses 240 and 241 for controlling the flow of working fluid through the hoses 240 and 241, as will be discussed in greater detail presently.

For moving the carriages 56 and 57, and therefore, the cage 50 and the grab 52 longitudinally along the I-beams 33 and 34, which form a part of the stationary supporting structure of the hoisting device H2, as previously discussed, I afford a motor 246 which comprises a housing or cylinder 248 and a plunger or piston 249, Figs. 1 and 3. The housing 248 of the motor 246 extends between the cross braces 36 and 37 and is secured to the lower face thereof by suitable means such as welding, the motor 246 being disposed between the I-beams 33 and 34, in substantially parallel relation thereto.

The free end portion of the piston 249 of the motor 246 is connected by a pin 252 and a bracket 253, Figs. 1 and 3, to the rear end portion of the supporting frame 54 of the carriage 50. Two stops 255 and 256 are mounted on the front and rear end portions, respectively, of each of the I-beams 33 and 34, the stops 255 on the front end portions of the I-beams 33 and 34 being disposed to engage the front end portion of the carriages 56 and 57 to thereby limit forward movement of the grab 52 and the cage 50 along the I-beams 33 and 34, and the stops 256 on the I-beams 33 and 34 being positioned to engage the rear end portion of the carriages 56 and 57 to thereby limit rearward movement of the cage 50 and the grab 52 along the I-beams 33 and 34.

It will be seen that with the cylinder 248 of the motor 246 stationarily mounted on the cross braces 36 and 37, as previously discussed, movement of the plunger 249 inwardly and outwardly relative to the cylinder 248 may be effective to move the carriages 56 and 57 and, therefore, the cage 50 and the grab 52 back and forth along the I-beams 33 and 34, between the stops 255 and 256. For the purpose of effecting such reciprocation of the plunger 249 in the cylinder 248 I have afforded suitable hoses or conduits 258 and 259 which are connected to the front and rear end portions of the cylinder 248, respectively, Fig. 3, for the purpose of feeding a suitable working fluid such as, for example, hydraulic fluid into and out of the cylinder 248 under the control of means which will be discussed in greater detail hereinafter.

It will be remembered that during the operation of my novel foundry system the operator, controlling the operation thereof, stands on the platform 65 of the cage 50. As previously mentioned, the cage 50 moves with the grab 52 longitudinally of the I-beams 33 and 34 during operation of the hoisting device H2 and for the purpose of affording controls for the various mechanisms embodied in my novel foundry system, I have mounted the various controls on the cage 50 within the easy reach of the operator. Thus, for example, it will be seen that a control panel 260, Figs. 2, 3 and 6 is mounted on the rearwardly disposed face of the hanger arm 63 and contains control units U1, U2 and U3 for controlling the travel of the cage 50 and the grab 52 longitudinally of the I-beams 33 and 34, controlling the raising and lowering of the grab 52, and controlling the opening and closing of the grab 52, respectively, as will be discussed in greater detail presently.

I prefer that the motors 115, 135 and 191 be pneumatically operated motors, and that the motor 246 be hydraulically operated but be pneumatically controlled, and for these purposes I afford a suitable air line such as a pipe 265, Figs. 2, 3 and 6, mounted on the front face of the hanger arm 63 by suitable brackets 266, which pipe may be connected by a suitable conduit such as an air hose 268 to a suitable source of fluid supply such as, for example, an air compressor, not shown.

It will be remembered that the hydraulic motor 246 is mounted on the lower face of the brackets 36 and 37, and that one end of the hoses 258 and 259 are connected to the front and rear end portions, respectively, of the cylinder 248 of the motor 246. The other end of the line 258 is connected to two parallel lines 270 and 271, Fig. 8, which are connected by a line 273 to the lower end portion of a hydraulic reservoir or tank 275, which is connected by a line 277 to one discharge port 278 of a control valve 280 of the control unit U1. A one-way check valve 282, constituted and arranged to open to permit flow from the motor 246 through the line 270 toward the reservoir 275 is mounted in the line 270; and a manually operable control valve 283 is mounted in the line 271 for controlling the opening and closing of the line 271. Hence, it will be seen that by opening and closing the valve 283, flow of hydraulic fluid from the tank 275 to the motor 246 may be controlled, but that a by-pass is afforded through the line 270 through which hydraulic fluid may return from the motor 246 to the tank 275 irrespective of whether or not the valve 283 is open or closed.

The line 259 connected to the rear end portion of the cylinder 248 of the motor 246 is similarly connected to two parallel lines 285 and 286 which are connected by a line 288 to the lower end portion of a hydraulic reservoir or tank 289, and the upper end portion of the tank 289 is connected by a line 291 to another discharge port 292 of the control valve 280. An air inlet line 294 having one end portion connected to the air conduit 265, Fig. 6, is connected at its other end to an inlet port 296 on the control valve 280, and affords means for feeding air from the conduit 265 into the valve 280. An exhaust conduit 298 having one end open to atmosphere, is connected at its other end to a discharge port 299 on the control valve 280.

A handle 301 mounted on the valve 280 is manually operable to selectively connect the discharge ports 278 and 292 with the exhaust port 299 and the inlet port 296, in a manner well known to those skilled in the art. The specific construction of the control valve 280 forms no part of my invention except insofar as it forms a part of my novel combination, and various types of control valves which are operable in the same manner as the control valve 280, and which are well known to those skilled in the art, may be used without departing from the purview of my invention.

The control valve 280, which I prefer to use is of the type wherein, when the handle 301 is disposed in position to interconnect the air inlet port 296 with the air discharge port 278, the air discharge port 292 is simultaneously interconnected with the exhaust port 299; and, vice versa, when the control handle 301 is disposed in position to connect the air inlet port 296 with the air discharge port 292, the air discharge port 278 is simultaneously connected with the exhaust port 299; also, when the handle 301 is disposed in a position intermediate the aforementioned two positions, all the ports 278, 292, 296 and 299 are closed.

Thus, it will be seen, that, when it is desired to move the piston 249 to the right in the cylinder 248, as viewed in Figs. 3 and 8, to thereby move the cage 50 and the grab 52 rearwardly or, in other words, from left to right on the I-beams 33 and 34, the handle 301 of the control valve 280 may be turned to the position wherein the air inlet port 296 is connected with the discharge port 278, and the discharge port 292 is connected with the exhaust port 299, whereby air from the conduit 265 may flow through the line 294, the inlet port 296, the outlet port 278 and the line 277 into the upper end portion of the reservoir 275 to thereby build up pressure in the upper end portion of the reservoir 275. This increase of pressure in the reservoir 275 is effective to force hydraulic fluid from the bottom of the tank 275 through the line 273, and, the valve 283 being open, through the line 271 and the line 258 into the front end portion of the cylinder 248 to thereby push the piston 249 rearwardly or, in other words, to the right, as viewed in Fig. 8. Such movement of the piston 249 in the cylinder 248 is effective to force hydraulic fluid disposed in the cylinder 248 on the right side of the piston 249, as viewed in Fig. 8, outwardly through the line 259, the lines 285 and 286, and the line 288, into the bottom of the reservoir 289. The feeding of hydraulic fluid into the bottom of the tank 289, of course, raises the level of the hydraulic fluid in the tank 289 and, the discharge port 292 being interconnected with the exhaust port 299, is effective to push air out of the upper end portion of the tank 289 through the line 291, the port 292, the exhaust port 299, and the exhaust conduit 298. It will be seen that if, after moving the piston 249 to the right in the cylinder 248, it is desired to then move the piston 249 to the left, the position of the handle 301 may be reversed to thereby connect the inlet port 296 to the discharge port 292 and connect the discharge port 278 with the exhaust port 299 and force hydraulic fluid from the tank 289 into the cylinder 248 on the right end side of the piston 249, as viewed in Fig. 8, to thereby move the piston 249 to the left and force hydraulic fluid from the left side of the piston 249 back into the tank 275 and the line 277 to flow outwardly to the atmosphere through the ports 278 and 299, and the exhaust conduit 298. After the piston has been moved to the desired position in the cylinder 248, the handle 301 may be moved to the aforementioned intermediate position, wherein all of the ports 278, 292, 296 and 299 are closed so that the conduits leading to the cylinder 248 may be closed to thereby hold the piston in the adjusted position.

Control of the motor 191 which, it will be remembered, is operated to raise and lower the grab 52, may be effected by a valve 280a in the control unit U2 which is of the same construction as the valve 280 in the control unit U1. However, as is best seen in Fig. 10, operation of the motor 191 is preferably effected directly by air pressure without the intervening hydraulic system embodied in the travel control system of the motor 246. Thus, it will be seen that the lines 240 and 241 which, it will be remembered, are connected at one end by coupling members 242 and 243, respectively, to the front and rear end portions of the cylinder 192 of the motor 191, are connected at their other ends to discharge ports 278a and 292a on the valve 280a. Like the valve 280, the valve 280a, Figs. 6 and 10, is connected to the air conduit 265 by an air inlet line 294a having one end portion connected to the air inlet port 296a of the valve 280a, and the other end portion connected to the conduit 265. A discharge conduit 298a having one end open to atmosphere and the other end connected to discharge port 289a on the valve 280a is afforded for discharging compressed air from the lines 240 and 241 in the same manner that air was discharged from the lines 277 and 291 through the valve 280.

Like the handle 301 on the valve 280, the handle 301a on the valve 280a is manually operable to selectively connect the discharge ports 278a and 292a with the inlet port 296a and the exhaust port 299a, and is also operable to close all the ports 278a, 292a, 296a, and 299a. Thus, it will be seen that if it is desired to move the piston 193 to the right, as viewed in Fig. 10, the operator may turn the handle 301a to the predetermined position wherein the discharge port 278a is connected to the inlet port 296a, and the exhaust port 299a is connected to the discharge port 292a whereby the valve 280a is so set that compressed air may flow from the conduit 265a through the line 294a, the inlet port 296a, the discharge port 278a, the line 240, and the fitting 242 into the cylinder 192 of the motor 191 on the left side of the piston 193, as viewed in Fig. 10, to thereby force the piston 193 to the right and feed air from the right end portion of the cylinder 192 outwardly therefrom through the fitting 243, the line 241, the discharge port 292a, the exhaust port 298a, and the discharge conduit 298a, to the atmosphere. If it is desired to move a piston 193 to the left, as viewed in Fig. 10, it will be seen that by properly positioning the handle 301a of the valve 280a, the valve may be set any position wherein air may be fed from the air line 265 through the air line 294a, the inlet port 296a, the discharge port 292a, the line 241, and the fitting 243 into cylinder 192 and air may be fed from the cylinder 292 through the fitting 242, the line 240, the discharge port 278a, the exhaust port 299a and the discharge conduit 298a to the atmosphere.

It will be remembered that two pneumatically operated motors 115 and 135, are embodied in my novel grab 52 for opening and closing the grappling arms 77 and 78 thereof. As previously mentioned, two hoses 181 and 186 are connected to opposite end portions of the cylinder 117 of the motor 115, by suitable fittings 183 and 188, respectively, and two hoses 182 and 187 are connected to the opposite end portions of the cylinder 136 of the motor 135 by suitable fittings 184 and 189, respectively. The other end portions of the hose 186 on the motor 115, and the hose 187 on the motor 135, are connected to one end portion of a line 277a mounted in suitable brackets 305 on top of the I-beam 74 on the grab 52, Figs. 4 and 9. The other end portion of the line 277b is connected to a discharge port 278b on a valve 280b which is of the same construction as the valves 280 and 280a. The other ends of the other lines 181 and 182 connected to the motors 115 and 135 are connected to one end of a line 291b mounted in suitable brackets 306 on the top of the I-beam 74 of the grab 52, Figs. 4 and 9, and the other end of the line 291b is connected to a discharge port 292b of the valve 280b. The inlet port 296b of the valve 280b is connected by a line 294b to the conduit 265, Figs. 6 and 9, and, like the valve 280, a discharge conduit 298b having one end open to the atmosphere is provided, the other end portion of the discharge conduit 298b being connected to the discharge port 299b on the valve 280b. Thus it will be seen that by feeding air selectively into the lines 291b, air may be fed simultaneously into the corresponding end portions of the cylinders 117 and 136, respectively, of the motors 115 and 135. For example, if it is desired to feed air into the front portion of the cylinders 117 and 136 to thereby move the pistons 118 and 137 rearwardly therein, the handle 301b of the valve 280b may be manually moved to the position wherein the inlet port 296b is interconnected with the discharge port 278b and the discharge port 292b is connected with the exhaust port 299b, whereby air may flow from the conduit 265 through the line 294b, the inlet port 296b, the discharge port 278b, the line 277b, and from the line 277b, simultaneously through the lines 186 and 187 and the fittings 188 and 189 into the front end portions of the cylinders 117 and 136 of the motors 115 and 135, respectively, and air may flow simultaneously from the rear end portions of the cylinders 117 and 136 outwardly through the fittings 183 and 184, the lines 181 and 182, into the line 291b, and then through the discharge port 292b, the exhaust port 299b and the exhaust conduit 298b to the atmosphere. Reversal of the flow of air into and out of the cylinders 117 and 136 may be effected by moving the handle 301b to the proper position to thereby feed air from the conduit 265 through the discharge port 292b into the rear end portion of the cylinders 117 and 136 and feed air from the front end portions of the cylinders 117 and 136 through the discharge port 278b and outwardly through the exhaust port 299b and the exhaust conduit 298b to the atmosphere.

The control valves 280, 280a and 280b of the control units U1, U2 and U3, respectively, are preferably mounted on the panel 269 within easy reach of the operator, when the operator is standing on the platform 65 of the cage 50 during operation of my device. Thus it will be seen that if it is desired to open or close the grab 52, or to raise or lower the grab 52, or to move the grab 52 and the cage 50 along the I-beams 33 and 34, the operator may perform any of these operations selectively or simultaneously by proper manipulation of the handles 301b, 301a or 301 of the valves 280b, 280a and 280 in the control units U3, U2 and U1, respectively.

In connection with the raising and lowering of the grab 52, it will be noted that such movement of the grab 52 is effected between the arms 42 and 43 of the grab stop 40. Two brackets 310 and 311, Figs. 2 and 5, are mounted on the opposite end portions of the I-beam 74 of the grab 52, the brackets 310 and 311 being of any suitable material such as, for example, angle iron, and affording horizontally projecting flanges 310a and 311a which are engageable with the legs 46 and 45 on the arms 43 and 42, respectively, of the grab stop 40 when the grab 52 is disposed in lowermost position, whereby the grab 52 is positively supported in the aforementioned lowermost position and is prevented from being lowered beyond this position which is at a predetermined height over the conveyor C for properly positioning the jaws 101 and 105 of the grappling arms 77 and 78, to engage the sides of molds, which are disposed on the conveyor C at station II when it is desired to pick up such molds in the grab 52. Normally, I prefer that this lowermost position of the jaws 101 and 105 of the grab 52 be such that the jaws 101 and 105 of the grab will engage the outer face of the drag of molds below the handles, such as handles 315, Fig. 3, thereon.

Other controls may be mounted by suitable means such as a control panel 330, Figs. 1 and 2, on the guard rail 69 of the cage 50, within easy reach of an operator standing on the platform 65 for controlling the operation of the conveyor C and the grab H1 as is discussed in greater detail in my aforementioned copending application, Serial No. 126,112.

The molds fed along the conveyor C into position at station II are preferably mounted on pallets 352, Figs. 2 and 3, which comprise side rails 354 and 355 disposed in parallel spaced relation to each other and connected together at each end by end rails 357. The side rails 354 and 355 of the pallets 352 are constituted and arranged in such a manner that they are positioned on the peripheral edge portions of the rollers 349 and 350, respectively, for movement along the conveyor C.

*Operation*

In a typical operation of my novel hoist H2, when a mold M, mounted on a pallet 352 is moved along the conveyor C into position at station II, the operator may move the handle 301a of the valve 280a to the aforementioned position wherein the control unit U2 is effective to cause lowering of the grab 52, and the grab 52 may thereby be lowered to the lowermost position wherein it rests on the grab stop 40, as previously described. The handle 301a may then be moved to neutral position, and the handle 301b may be moved to grab-closing position wherein the grappling arms 77 and 78 are caused to move toward each other into engagement with the flask of the mold M beneath the handles 315 on the drag of the mold. The handle 301b may then be moved to neutral position to hold the grappling arms 77 and 78 in this closed position.

Thereafter, the operator may turn the handle 301a of the control unit U2 into grab raising position, and effect upward movement of the grab 52 to thereby raise the molds M disposed at station I off from the bottom boards 359 and the pallet 352, and, after moving the handle 301a to neutral position to thereby hold the grab 52 in raised position, the operator may turn the handle 301 of the control unit U1 to forward-moving position to thereby effect actuation of the motor 246 and cause the grab 52 and the cage 50 to move forwardly along the I-beams 33 and 34 toward the shake-out device D. As the grab 52 and the cage 50 are moved forwardly by the motor 246 toward the shake-out device D, a wiper blade 395, mounted on and depending from the front edge portion of the platform 65 of the cage 50 scrapes across the top surface of the bottom boards 359 on the pallet 352 disposed in station I and thereby causes any loose sand or other foreign material to be scraped from the bottom boards onto a plate 396 which is mounted below the level of the bottom boards between the shake-out device D and the conveyor C on suitable bracing members 398 mounted on the shake-out device D and the frame 340 of the conveyor C.

When the grab 52 and the cage 50 have been moved forwardly a sufficient distance that the molds M carried by the grab 52 are disposed over the screen 20 of the shake-out device D, the operator may stop movement of the grab 52 and the cage 50 in a horizontal direction by turning the handle 301 of the control unit U1 into neutral position. Thereafter, the operator may turn the handle 301b of the control unit U2 into grab-lowering position and thereby lower the molds mounted therein onto the screen 20 of the shake-out device D, and permit the molds M to be vibrated thereon until the sand and the castings disposed therein are shaken out onto the screen 20. Thereafter, the operator may raise the shaken out molds by turning the handle 301a of the control unit U2 into position to effect raising of the grab 52, and, after stopping the upward movement of the grab 52 by turning the handle 301b to neutral position, may then initiate return movement of the cage 50 and the grab 52 to normal position wherein the grab 52 is disposed in vertical alignment with the conveyor C at station II, by turning the handle 301 of the control unit U1 to the position to effect operation of the motor 246 to move the grab 52 and cage 50 rearwardly along the I-beams 33 and 34, as previously described.

Upon return of the cage 50 and the grab 52 to normal position relative to the conveyor C, the grab may be stopped by turning the handle 301, and the grab 52 may then be lowered by turning the handle 301b to the proper position, and the grappling arms 77 and 78 may then be moved to open position by turning the handle 301b to open position, to thereby return the emptied mold M to its normal position on the pallet 352. This operation may be repeated as often as molds M and pallets 352 are moved into position at station II.

Thus, it will be seen that during the operation of my novel foundry system, the operator is at all times in an advantageous position to determine the proper operation of the various units, and is at all times within easy reach of the controls for controlling the operation of the units.

From the foregoing it will be seen that I have afforded novel foundry equipment which is operable in a novel and expeditious manner to afford a practical and efficient means for handling molds in the production of castings.

Also, it will be seen, that I have afforded a novel grab which is constructed, and is operable, in a novel and expeditious manner.

Furthermore, it will be seen that I have afforded novel equipment which is efficient and practical in operation and may be economically manufactured commercially.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claim.

I claim:

A hoisting device comprising a supporting means, a grab, and mounting means movably suspending said grab from said supporting means for movement upwardly and downwardly relative to said supporting means, said mounting means comprising two rods rotatably mounted on said supporting means in parallel spaced relation to each other, two pairs of sprocket wheels mounted on one of said rods for rotation therewith in spaced relation to each other, two other sprocket wheels mounted in spaced relation to each other on the other of said rods for rotation therewith, each of said other sprocket wheels being disposed in radial alignment with a respective one of said wheels in a corresponding one of said pairs of wheels, four sprocket chains, each of said sprocket chains having one end connected to one of said first mentioned wheels, each of said chains which are connected to said respective ones of said first mentioned wheels being trained over said corresponding one of said other wheels and depending therefrom, the other of said chains which are connected to the other of said first mentioned wheels being trained thereover and depending therefrom, each of said four chains having the end thereof opposite said one end connected to said grab, and means, including a driving sprocket wheel connected to said one shaft, and a piston operatively connected thereto, for rotating said first mentioned wheels and said other wheels to thereby raise and lower said chains and thereby raise and lower said grab.

References Cited in the file of this patent

UNITED STATES PATENTS

| | | |
|---|---|---|
| 846,837 | Evans | Mar. 12, 1907 |
| 909,606 | Kendall | Jan. 12, 1909 |
| 992,307 | Weickel et al. | May 16, 1911 |
| 1,136,939 | Colby et al. | Apr. 27, 1915 |
| 1,239,110 | Knutson | Sept. 4, 1917 |
| 2,525,572 | Woody et al. | Oct. 10, 1950 |
| 2,598,222 | Cahners et al. | May 27, 1952 |